United States Patent
Bakin et al.

(10) Patent No.: US 10,001,583 B2
(45) Date of Patent: Jun. 19, 2018

(54) STRUCTURED LIGHT PROJECTION USING A COMPOUND PATTERNED MASK

(71) Applicant: Heptagon Micro Optics Pte. Ltd., Singapore (SG)

(72) Inventors: Dmitry Bakin, San Jose, CA (US); Matthias Gloor, Boswil (CH); Moshe Doron, San Francisco, CA (US)

(73) Assignee: Heptagon Micro Optics Pte. Ltd., Singapore (SG)

( * ) Notice: Subject to any disclaimer, the term of this patent is extended or adjusted under 35 U.S.C. 154(b) by 141 days.

(21) Appl. No.: 15/082,805

(22) Filed: Mar. 28, 2016

(65) Prior Publication Data

US 2016/0291200 A1    Oct. 6, 2016

Related U.S. Application Data

(60) Provisional application No. 62/143,392, filed on Apr. 6, 2015.

(51) Int. Cl.
*G01V 8/20* (2006.01)
*G03B 17/54* (2006.01)
*G03B 21/20* (2006.01)

(52) U.S. Cl.
CPC ............ *G01V 8/20* (2013.01); *G03B 17/54* (2013.01); *G03B 21/2066* (2013.01); *G03B 2215/0596* (2013.01)

(58) Field of Classification Search
CPC ....................................................... G01V 8/20
See application file for complete search history.

(56) References Cited

U.S. PATENT DOCUMENTS

| | | | | |
|---|---|---|---|---|
| 6,160,527 A | * | 12/2000 | Morishima | G02B 27/2214 345/32 |
| 8,749,796 B2 | | 6/2014 | Pesach et al. | |
| 8,908,277 B2 | | 12/2014 | Pesach et al. | |
| 9,063,283 B2 | | 6/2015 | Shpunt et al. | |
| 2009/0185274 A1 | * | 7/2009 | Shpunt | G02B 27/0944 359/558 |
| 2011/0188054 A1 | * | 8/2011 | Petronius | B23P 11/00 356/610 |
| 2013/0250066 A1 | * | 9/2013 | Abraham | H04N 13/0203 348/46 |
| 2014/0376092 A1 | | 12/2014 | Mor | |
| 2015/0316368 A1 | * | 11/2015 | Moench | H01S 5/005 348/46 |

* cited by examiner

*Primary Examiner* — David Porta
*Assistant Examiner* — Jeremy S Valentiner
(74) *Attorney, Agent, or Firm* — Fish & Richardson P.C.

(57) ABSTRACT

The present disclosure describes structured light projection in which a structured light projector includes a light emitter and a compound patterned mask. The mask includes a spacer substrate that is transparent to a wavelength of light emitted by the light emitter. On a first side of the spacer substrate is a first reflective surface having apertures therein to allow light to pass through. Lenses are arranged to focus light, produced by the light emitter, toward the apertures in the first reflective surface. A second reflective surface on a second side of the spacer substrate opposite the first side has apertures therein to allow light passing through the spacer substrate to exit the compound patterned mask.

20 Claims, 5 Drawing Sheets

STRUCTURED LIGHT PROJECTION USING A COMPOUND PATTERNED MASK

CROSS-REFERENCE TO RELATED APPLICATION(S)

The present application claims the benefit of priority of U.S. Provisional Patent Application No. 62/143,392, filed on Apr. 6, 2015, the contents of which are incorporated herein by reference.

FIELD OF THE DISCLOSURE

The present disclosure relates to structured light projection.

BACKGROUND

Various imaging applications use compact optoelectronic modules that can be integrated, for example, within personal computing devices such as smart phones, tablets, laptops or personal computers. In some applications, the module can include a light source to project a structured light pattern onto a scene that includes one or more objects of interest. Light from the projected pattern is reflected by the objects in the scene and is sensed by one or more imagers for use, for example, in stereo matching to generate a three-dimensional image. The structured light can provide additional texture for matching pixels in the stereo images.

One challenge, however, in designing a light projector to project a pattern onto the scene is how to replicate, in an effective manner, a particular pattern in the far field (i.e., on the objects in the scene).

SUMMARY

The present disclosure describes structured light projection using a compound patterned mask.

For example, in one aspect, a structured light projector includes a light emitter and a compound patterned mask. The mask includes a spacer substrate that is transparent to a wavelength of light emitted by the light emitter. On a first side of the spacer substrate is a first reflective surface having apertures therein to allow light to pass through. Lenses are arranged to focus light, produced by the light emitter, toward the apertures in the first reflective surface. A second reflective surface on a second side of the spacer substrate opposite the first side has apertures therein to allow light passing through the spacer substrate to exit the compound patterned mask.

Some implementations include one or more of the following features. For example, in some cases, each of the first and second reflective surfaces comprises a metal or some other reflective coating. In some instances, each of the first and second reflective surfaces comprises at least one of gold, aluminum, chromium or a dichroic material.

The lenses can include an array of micro lenses each of which is arranged to focus light to a respective one of the apertures in the first reflective surface. In some implementations, the structured light projector includes an optical collimator disposed between the light emitter and the compound patterned mask. The optical collimator can be arranged to uniformly illuminate the compound patterned mask with light produced by the light emitter.

An arrangement of the apertures in the first reflective surface can match an arrangement of the lenses. Further, the arrangement of apertures in the first reflective surface can differ from an arrangement of the apertures in the second reflective surface.

In some cases, the light emitter includes multiple vertical cavity surface emitting lasers. The light projector produces, in some implementations, a structured pattern of light in the IR or near-IR region of the spectrum.

In another aspect, the disclosure describes an optoelectronic apparatus that includes a light projector operable to project a structured light pattern onto an object, and an image sensor arranged to receive light reflected by the object.

In accordance with another aspect, the disclosure describes a method of producing structured light. The method includes causing light of a particular wavelength to be emitted toward a plurality of lenses and causing the light received by the lenses to be focused toward apertures in a first reflective surface. Some of the light is allowed to pass through apertures in a second reflective surface spaced apart from the first reflective surface, whereas some of the light is reflected from the second reflective surface back toward the first reflective surface. Subsequently, some of the reflected light is reflected, by the first reflective surface, back toward the second reflective surface such that at least some of the previously reflected light passes through the apertures in the second reflective surface.

The compound patterned mask can, in some cases, help increase the optical throughput of the mask so as to replicate more effectively the projected optical pattern in the far field. The light projectors described here can be used, for example, in encoded light and active stereo applications.

Other aspects, features and advantages will be readily apparent from the following detailed description, the accompanying drawings, and the claims.

DETAILED DESCRIPTION

Figure 1:
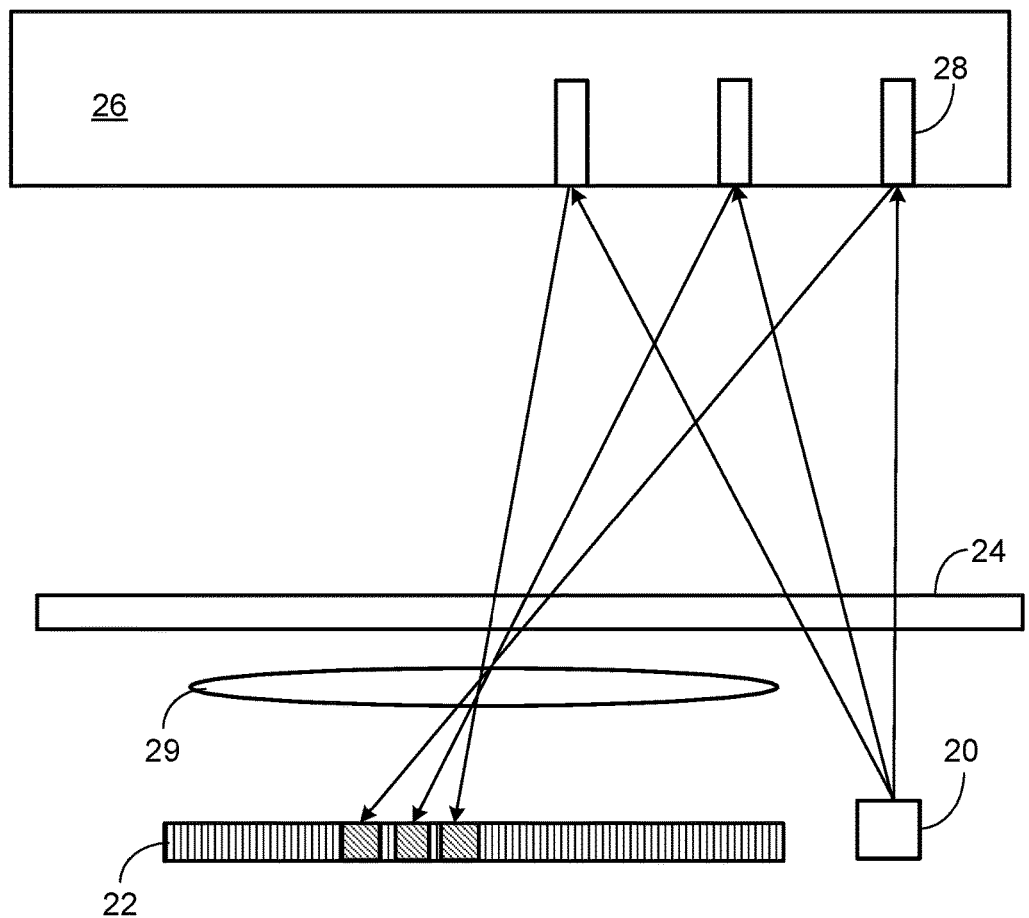
FIG. 1 illustrates an example of optoelectronic system that includes a light projector.

As illustrated in FIG. 1, an optoelectronic system includes a light projector 20 to project a structured light pattern 28 onto one or more objects in a scene 26 of interest. In some implementations, the projected pattern consists of light in the IR or near-IR region of the spectrum. Light from the projected pattern 28 can be reflected by the object(s) in the scene 26 and sensed by an image sensor 22 that includes spatially distributed light sensitive components (e.g., pixels) that are sensitive to a wavelength of light emitted by the light projector 20. The detected signals can be read-out and used, for example, by processing circuitry for stereo matching to generate a 3D image. In some cases, one or more optical elements such as lenses 29 help direct the light reflected from the scene 26 toward the image sensor 22. Using structured light can be advantageous, for example, in providing additional texture for matching pixels in the stereo images.

In some implementations, the light projector 20, the lenses 29 and the image sensor 22 are integrated within a mobile host computing device such as a cellular phone, smartphone, tablet, personal data assistant, or notebook computer with networking capability. In such cases, the light projector 20, the lenses 29 and the image sensor 22 can be disposed below a front side cover glass 24 of the host device. The structured light emitted by the light projector 20 can result in a pattern 28 of discrete features (i.e., texture or encoded light) being projected onto objects in the scene 26 external to the host device. In some instances, the light projector 20, the lenses 29 and the image sensor 22 are components of the same optoelectronic module. In other implementations, the light projector 20 can be a discrete component that is not integrated into the same module as the image sensor 22 and/or lens 29. Further, the light projector 20 can be used in other types of applications (e.g., proximity sensing, distance determinations using triangulation) as well and is not limited to the imaging applications referred to above.

Figure 2:
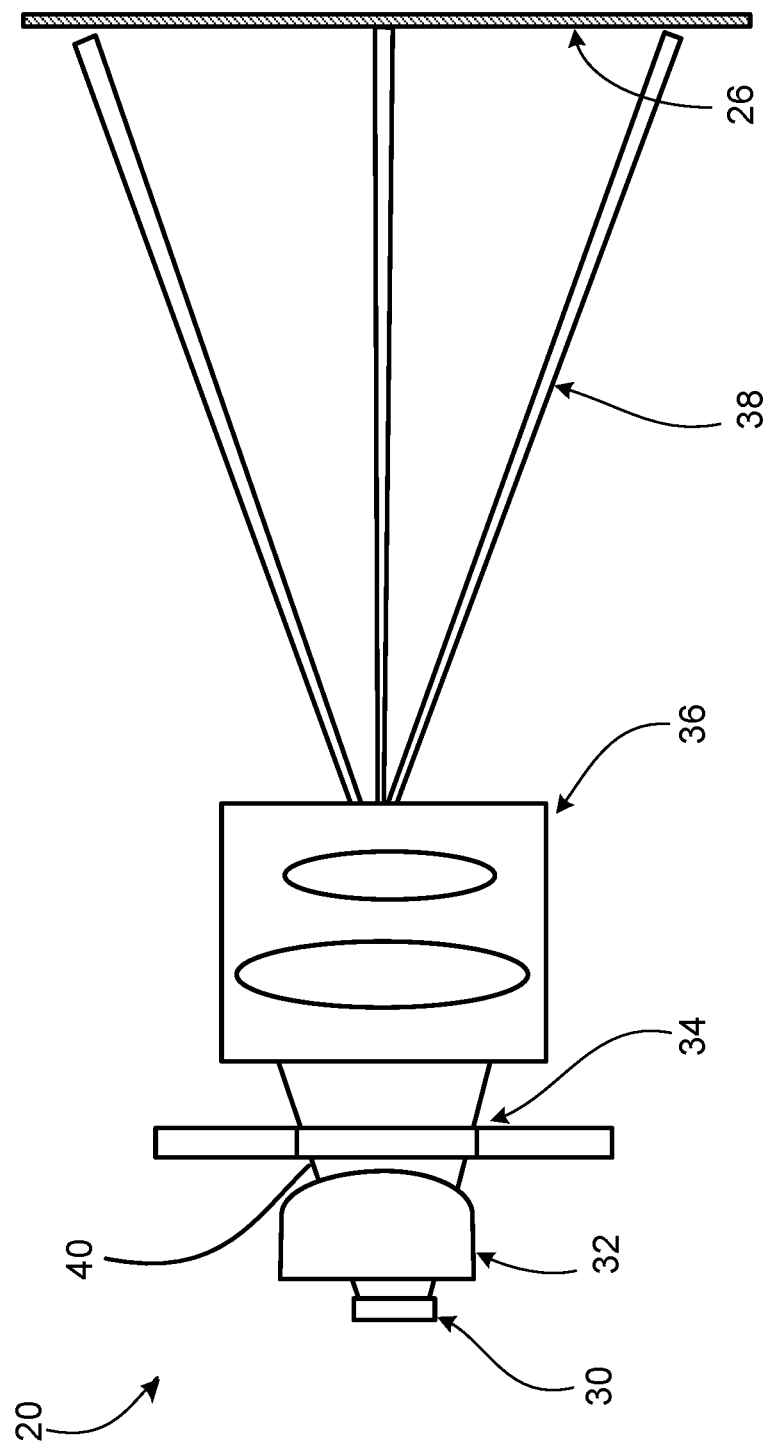
FIG. 2 illustrates an example of the light projector.
Figure 3:
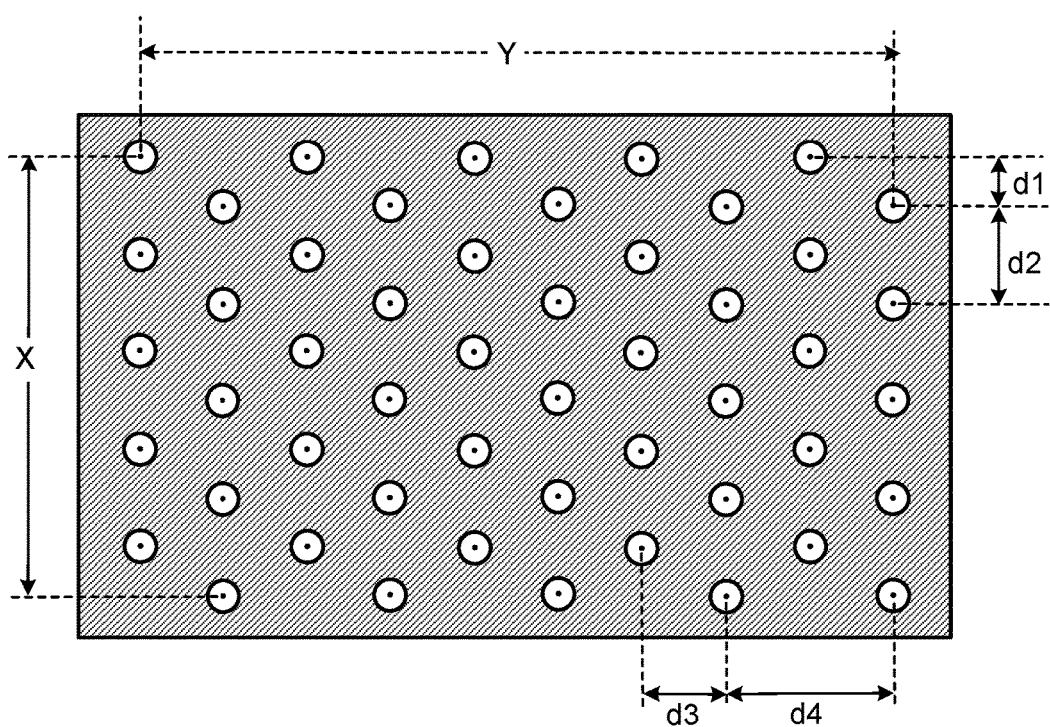
FIG. 3 illustrates an example of an arrangement of vertical cavity surface emitting lasers (VCSELs) for the light projector.

As illustrated in FIG. 2, the light projector 20 can include a light source 30, for example, a high-power light emitting element such as a laser diode, VCSEL or array of VCSELs operable to emit a predetermined narrow range of wavelengths, e.g., in the IR or near-IR part of the spectrum. An example of a suitable VCSEL array layout is illustrated in FIG. 3. In the illustrated example, the overall dimensions of the array are X×Y, where the width X=198 μm, and the length Y=342 μm. In the illustrated example, the vertical distance d1 between adjacent rows of VCSELs is 22 μm, and the vertical pitch d2 of the arrangement is 44 μm. Also in the illustrated example, the horizontal distance d3 between adjacent columns of VCSELs is 38 μm, and the horizontal pitch d4 of the arrangement is 76 μm. Different dimensions may be appropriate for some implementations.

The light projector 20, in some cases, is operable to emit light in the range of about 850 nm+10 nm, or in the range of about 830 nm+10 nm, or in the range of about 940 nm+10 nm. Different wavelengths and ranges may be appropriate for other implementations. In some instances, the optical output of the light projector 20 in the range of 20-500 mW. For example, in a particular implementation, the individual VCSELs have a circular emitting profile with a numerical aperture (NA) of 0.15 and a peak power of 5 mW. The total output power of the VCSEL array in some cases is about 250 mW.

As further shown in FIG. 2, the light projector 20 includes an optical collimator 32 arranged to uniformly illuminate a compound patterned mask 34 with light from the light source 30 (e.g., the light emitter). The collimator 32 can include, for example, one or more collimating lenses disposed between the light emitter and the compound patterned mask 34. Further, in some cases, the compound projection mask 34 can be illuminated uniformly by a diffractive optical element disposed between the VCSEL array and the mask 34. In some implementations (e.g., where the distance between the VCSEL array of other light source 30 is sufficiently large), the collimator 32 can be omitted.

The compound patterned mask 34 can cover a relatively large area compared to the area of the VCSEL array or other light source 30. Light beams passing through the mask 34 then pass through a projection lens 36 to project light beams 38 that produce the structured light pattern 28.

Figure 4:
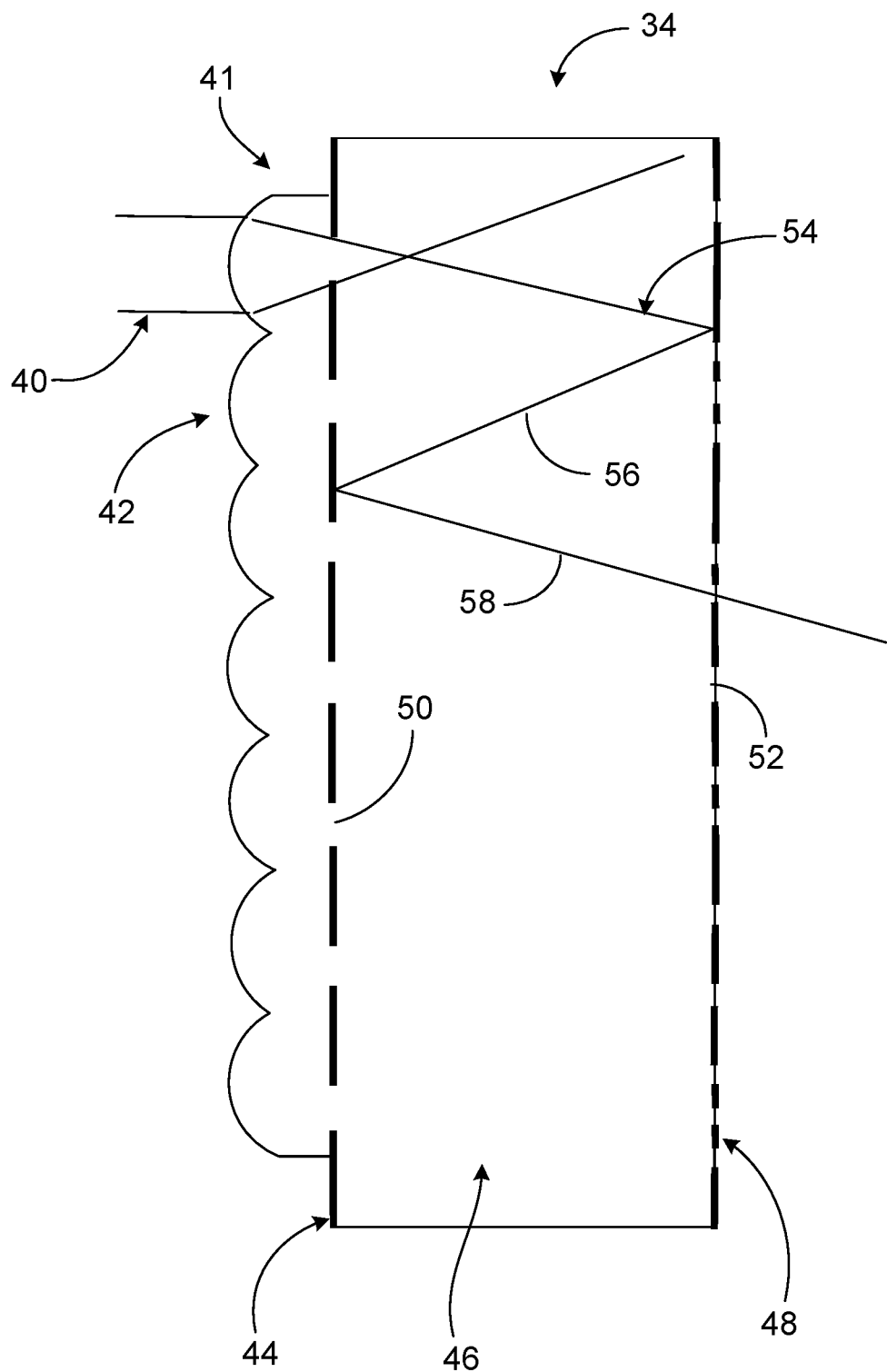
FIG. 4 illustrates further details of the light projector in some implementations.

Details of the compound patterned mask 34 according to some implementations are illustrated in FIG. 4. The mask 34 is composed of a spacer substrate 46 that is substantially transparent to the wavelength(s) of light emitted by the VCSEL array or other light source 30. The spacer substrate 46 separates a first reflective surface 44 from a second reflective surface 48. The first reflective surface 44 is disposed on the surface of the substrate 46 closer to the light source 30, whereas the second reflective surface 48 is disposed on the surface of the substrate 46 further from the light source 30. Further, a micro lens array 41 including micro lenses 42 is disposed on the first reflective surface 44 such that the first reflective surface 44 is disposed between the micro lens array 41 and the transparent substrate 46. The reflective surfaces 44, 48 are composed of a material that is reflective for wavelength(s) of light emitted by the VCSEL array or other light source 30.

Figure 5A:
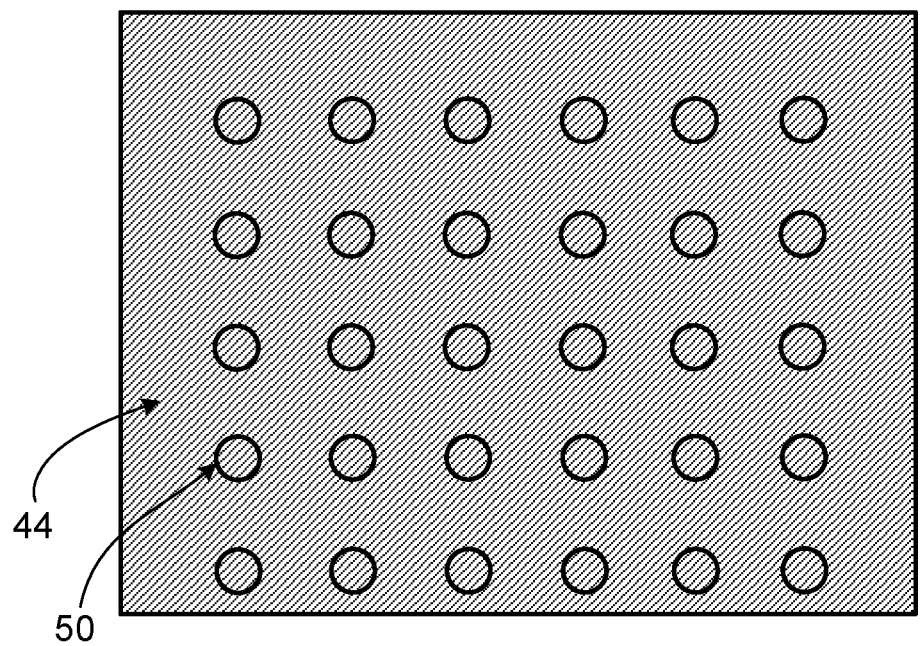
FIGS. 5A and 5B illustrate further details of the light projector in some implementations.
Figure 5B:
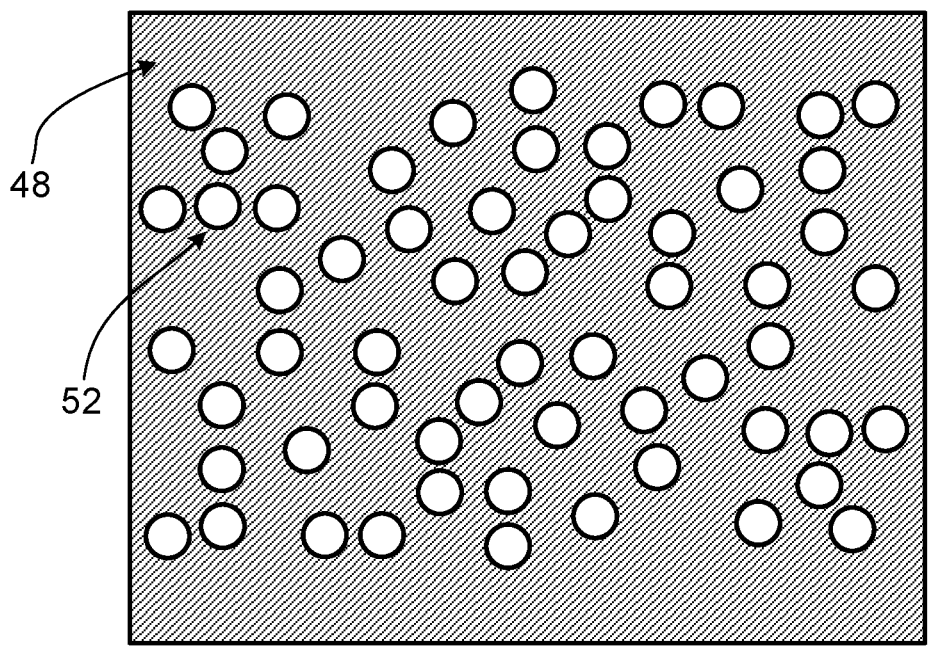

As further illustrated in FIGS. 5A and 5B, each of the reflective surfaces 44, 48 can be formed, for example, as a reflective coating composed, for example, of gold (Au), aluminum (Al), chromium (Cr) or a dichroic material. The coatings can be made of the same reflective material as one another or of different reflective materials. Each of the reflective coatings has respective transparent apertures 50, 52 through which light beams 40 can pass. The arrangement of apertures 50 in the first reflective coating should substantially match and be aligned with the arrangement of micro lenses 42. The arrangement of apertures 52 in the second reflective coating are used to generate the light beams 38 for the projected light pattern 28. Thus, the arrangement of apertures 52 in the second reflective coating can appear to be random, though they may be designed to project a predetermined or specified pattern onto one or more objects.

In operation, light from the VCSEL array or other source 30 is collimated (if necessary) and the light beams 40 exiting the collimator 32 are incident on the micro lenses 42 of array 41. Each micro lens 42 focuses all or most of the incident light through a respective corresponding one of the apertures 50 in the first reflective surface 44 of the mask 34. Some of the light passing through the transparent spacer substrate 46 passes through the apertures 52 in the second reflective surface 48 of the mask 34. On the other hand, some of the light (e.g., beam 54 in FIG. 4) that passes through the spacer substrate 46 initially may not pass through one of the apertures 52 in the second reflective surface 48, but instead may be incident on the reflective surface 48 itself. In that case, second reflective surface 48 reflects the light (e.g., beam 56) back through the spacer substrate 46 toward the first reflective surface 44. While some of the light reflected back toward the first reflective surface 44 may be lost if it passes back though one of the apertures 50, in many cases the beam 56 will be incident on the first reflective surface 44, which will reflect the light (e.g., beam 58) back toward the second reflective surface 48. At least in some cases, the reflected beam 58 will pass through one of the apertures 52 in the second reflective surface 48, thereby increasing the amount of light 38 that contributes to the pattern projected onto the scene 26. Some of the light beams may be reflected back in forth multiple times between the first and second reflective surfaces 44, 48 before passing through one of the apertures 52. The compound patterned mask 34 thus can help increase the optical throughput of the mask 34 and more effectively replicating the projected optical pattern in the far field.

Various modifications can be made within the spirit of the disclosure. Thus, other implementations are within the scope of the claims.

What is claimed is:

1. A structured light projector comprising:
a light emitter; and
a compound patterned mask including:
    a spacer substrate that is transparent to a wavelength of light emitted by the light emitter;
    a first reflective surface on a first side of the spacer substrate, the first reflective surface having apertures therein to allow light emitted by the light emitter to pass through;
    a plurality of lenses arranged to focus light, emitted by the light emitter, toward the apertures in the first reflective surface; and
    a second reflective surface on a second side of the spacer substrate opposite the first side, wherein the second reflective surface has apertures therein to allow light emitted by the light emitter and passing through the apertures in the first reflective surface and through the spacer substrate to exit the compound patterned mask, wherein an arrangement of the apertures in the first reflective surface differs from an arrangement of the apertures in the second reflective surface.

2. The structured light projector of claim 1 wherein each of the first and second reflective surfaces comprises a metal.

3. The structured light projector of claim 1 wherein each of the first and second reflective surfaces comprises a reflective coating.

4. The structured light projector of claim 1 wherein each of the first and second reflective surfaces comprises at least one of gold, aluminum, chromium or a dichroic material.

5. The structured light projector of claim 1 wherein the plurality of lenses includes an array of micro lenses each of which is arranged to focus light emitted by the light emitter through a respective one of the apertures in the first reflective surface.

6. The structured light projector of claim 1 further including an optical collimator disposed between the light emitter and the compound patterned mask.

7. The structured light projector of claim 6 wherein the optical collimator is arranged to uniformly illuminate the compound patterned mask with light produced by the light emitter.

8. The structured light projector of claim 1 wherein an arrangement of the apertures in the first reflective surface matches an arrangement of the plurality of lenses.

9. The structured light projector of claim 1 wherein the light emitter comprises a plurality of vertical cavity surface emitting lasers.

10. An optoelectronic apparatus comprising:
a light projector operable to project a structured light pattern onto an object; and
an image sensor arranged to receive light reflected by the object;
wherein the light projector includes:
    a light emitter; and
    a compound patterned mask including:
        a spacer substrate that is transparent to a wavelength of light emitted by the light emitter;
        a first reflective surface on a first side of the spacer substrate, the first reflective surface having apertures therein to allow light emitted by the light emitter to pass through;
        a plurality of lenses arranged to focus light, emitted by the light emitter, toward the apertures in the first reflective surface; and
        a second reflective surface on a second side of the spacer substrate opposite the first side, wherein the second reflective surface has apertures therein to allow light emitted by the light emitter and passing through the apertures in the first reflective surface and through the spacer substrate to exit the compound patterned mask, wherein an arrangement of the apertures in the first reflective surface differs from an arrangement of the apertures in the second reflective surface.

11. The apparatus of claim 10 wherein the plurality of lenses includes an array of micro lenses each of which is arranged to focus light to a respective one of the apertures in the first reflective surface.

12. The apparatus of claim 10 wherein an arrangement of the apertures in the first reflective surface matches an arrangement of the plurality of lenses.

13. The apparatus of claim 10 wherein the light projector produces a structured pattern of light in the IR or near-IR region of the spectrum.

14. A method of producing structured light, the method comprising:
causing light of a particular wavelength to be emitted toward a plurality of lenses;
causing the light received by the lenses to be focused toward apertures in a first reflective surface;
allowing some of the light to pass through apertures in a second reflective surface spaced apart from the first reflective surface, and reflecting some of the light from the second reflective surface back toward the first reflective surface; and
subsequently reflecting, by the first reflective surface, some of the light reflected from the second reflective surface, back toward the second reflective surface such that at least some of the light previously reflected from the second reflective surface passes through the apertures in the second reflective surface.

15. The method of claim 14 further including:
generating the light of the particular wavelength using an array of vertical cavity surface emitting lasers; and
collimating the light emitted by the array of vertical cavity surface emitting lasers so as illuminate the plurality of lenses substantially uniformly.

16. The method of claim 14 including projecting the structured light onto one or more objects.

17. The method of claim 14 wherein the first and second reflective surfaces are separated from one another by a transparent spacer substrate such that light passing through the apertures in the first reflective surface transits the spacer substrate before reaching the second reflective surface.

18. The method of claim 14 wherein the particular wavelength is in the IR or near-IR region of the spectrum.

19. The method of claim 14 wherein the light that passes through the apertures in the second reflective surface produces a structured light pattern onto an object.

20. The method of claim 14 wherein an arrangement of the apertures in the first reflective surface differs from an arrangement of the apertures in the second reflective surface.

* * * * *